US012767102B2

(12) United States Patent
Hillegass et al.

(10) Patent No.: US 12,767,102 B2
(45) Date of Patent: Oct. 20, 2026

(54) AUTOMATED AND MANUAL BRAKE TORQUE BIASING

(71) Applicant: GM GLOBAL TECHNOLOGY OPERATIONS LLC, Detroit, MI (US)

(72) Inventors: Joseph David Hillegass, Waterford, MI (US); Aaron Ronald, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 50 days.

(21) Appl. No.: 18/784,023

(22) Filed: Jul. 25, 2024

(65) Prior Publication Data

US 2026/0028001 A1 Jan. 29, 2026

(51) Int. Cl.
*B60T 8/1755* (2006.01)

(52) U.S. Cl.
CPC ...... *B60T 8/17551* (2013.01); *B60T 8/17552* (2013.01); *B60T 2230/02* (2013.01)

(58) Field of Classification Search
CPC ............. B60T 8/17551; B60T 8/17552; B60T 2230/02
See application file for complete search history.

(56) References Cited

U.S. PATENT DOCUMENTS

2003/0020326 A1* 1/2003 Salamat .............. B60T 8/17616 303/112
2017/0113664 A1* 4/2017 Nix ...................... G07C 5/0891
2017/0232944 A1* 8/2017 Owen ....................... B60T 7/12 701/94
2018/0170331 A1 6/2018 Barber et al.
2024/0132054 A1* 4/2024 Weston ................. B60W 30/02

FOREIGN PATENT DOCUMENTS

| | | | | | |
|---|---|---|---|---|---|
| CN | 100381314 | C | * | 4/2008 | .......... B60T 8/17557 |
| CN | 110053615 | A | * | 7/2019 | .......... B60W 40/105 |
| DE | 10222173 | A1 | | 11/2003 | |
| DE | 60207800 | T2 | * | 10/2006 | .......... B60T 8/17557 |
| DE | 102012207548 | A1 | | 11/2012 | |
| DE | 102022124550 | A1 | | 3/2024 | |
| DE | 102023212317 | A1 | | 8/2024 | |
| DE | 102023209176 | A1 | | 9/2024 | |
| JP | 3850530 | B2 | * | 11/2006 | ............ B60T 8/1755 |
| JP | 2011162004 | A | * | 8/2011 | ............ B60W 30/09 |
| JP | 2016094038 | A | * | 5/2016 | |
| JP | 2019131131 | A | * | 8/2019 | |

OTHER PUBLICATIONS

Machine Translation of JP2019131131A PDF File Name: "JP2019131131A_Machine_Translation.pdf" (Year: 2019).*

(Continued)

*Primary Examiner* — Grant Moubry
*Assistant Examiner* — Ruben Picon-Feliciano

(57) ABSTRACT

A brake torque bias control system for a host vehicle is disclosed. The brake torque bias control system includes: devices configured to generate signals; and a control module configured, based on the signals, to bias a first amount of brake torque applied to a first side of the host vehicle to be greater than a second amount of brake torque applied to a second side of the host vehicle.

20 Claims, 5 Drawing Sheets

(56) References Cited

OTHER PUBLICATIONS

Machine Translation of CN110053615A PDF File Name: "CN110053615A_Machine_Translation.pdf" (Year: 2019).*
Machine Translation of JP3850530B2 PDF File Name: "JP3850530B2_Machine_Translation.pdf" (Year: 2006).*
Machine Translation of CN100381314C PDF File Name: "CN100381314C_Machine_Translation.pdf" (Year: 2008).*
Machine Translation of JP2016094038A PDF File Name: "JP2016094038A_Machine_Translation.pdf" (Year: 2016).*
Machine Translation of JP2011162004A PDF File Name: "JP2011162004A_Machine_Translation.pdf" (Year: 2011).*
Machine Translation of DE60207800T2 PDF File Name: "DE60207800T2_Machine_Translation.pdf" (Year: 2006).*
German Office Action from counterpart DE1020241271159, dated May 8, 2025.

* cited by examiner

AUTOMATED AND MANUAL BRAKE TORQUE BIASING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle braking systems, and more particularly systems for adjusting and controlling understeer and oversteer.

Vehicles can include brake-by-wire systems for electronic deceleration purposes. The deceleration purposes may be associated with a brake torque request generated by a vehicle control module and/or as a result of a user actuating a brake actuator (e.g., a brake pedal). For example, vehicles can include deceleration control systems, object detection systems, collision avoidance systems, adaptive cruise control systems, forward collision warning systems, and autonomous vehicle control systems for detecting objects and taking actions to avoid a collision. An adaptive cruise control system may adjust speed of a host vehicle to prevent collision with another vehicle in front of the host vehicle. A collision avoidance system may detect an oncoming vehicle and take an evasive action and/or perform a countermeasure to avoid colliding with the approaching vehicle. The actions performed may include applying a brake to decelerate the host vehicle.

SUMMARY

A brake torque bias control system for a host vehicle is disclosed. The brake torque bias control system includes: devices configured to generate signals; and a control module configured, based on the signals, to bias a first amount of brake torque applied to a first side of the host vehicle to be greater than a second amount of brake torque applied to a second side of the host vehicle.

In other features, the devices are sensors configured to detect parameters of at least one of the host vehicle and another vehicle.

In other features, the parameters include a lane position of the host vehicle and a lane position of the another vehicle.

In other features, the parameters include at least one of yaw angle of the host vehicle, a yaw rate of the host vehicle, an understeer angle for the host vehicle, and a speed of the host vehicle.

In other features, the devices include paddle shifters.

In other features, the paddle shifters are configured to adjust the first amount of brake torque, the second amount of brake torque, and shift gears of a transmission of the host vehicle.

In other features, the devices include at least one of a human machine interface and at least one switch, which are configured to receive an input to transition between a brake torque bias control mode and a gear shifting control mode. During the brake torque bias control mode, the control module is configured to bias brake torque to a selected side of the host vehicle based on actuation of one or more of the devices. During the gear shifting control mode, the control module is configured to change the gears of the transmission of the host vehicle based on actuation of one or more of the devices.

In other features, the devices include at least one of a human machine interface and at least one switch, which is configured to adjust the first amount of brake torque and the second amount of brake torque.

In other features, the control module is configured to: obtain one or more target parameters including at least one of a target corner speed, a target understeer coefficient, a target oversteer coefficient, and a target lap time; and determine, based on the one or more target parameters, the first amount of brake torque and the second amount of brake torque.

In other features, the control module is configured to determine the first amount of brake torque and the second amount of brake torque based on status parameters. The status parameters include a yaw angle of the host vehicle, a yaw rate of the host vehicle, an understeer value of the host vehicle, and a speed of the host vehicle.

In other features, the control module is configured, based on changes in the status parameters due to application of the first amount of brake torque and the second amount of brake torque, to evaluate whether a vehicle response is converging towards satisfying the one or more target parameters.

In other features, the control module is configured, based on evaluation of the vehicle response, to execute a machine learning algorithm to adjust weighting of the status parameters, and based on the adjusted weighting, to apply an updated first amount of brake torque on the first side of the host vehicle and an updated second amount of brake torque on the second side of the host vehicle.

In other features, the control module is configured, while operating in a manual brake torque bias mode, to verify a response of the host vehicle to the first amount of brake torque and the second amount of brake torque applied, and to disable operating in the manual brake torque bias mode in response to an actual amount of brake torque bias being out of a predetermined range from a target brake torque bias.

In other features, a brake torque bias control method is disclosed and includes: generating signals via devices of a host vehicle; and based on the signals, biasing a first amount of brake torque applied to a first side of the host vehicle to be greater than a second amount of brake torque applied to a second side of the host vehicle.

In other features, the devices are sensors configured to detect parameters of at least one of the host vehicle and another vehicle. The parameters include a lane position of the host vehicle and a lane position of the another vehicle. The parameters include at least one of yaw angle of the host vehicle, a yaw rate of the host vehicle, an understeer angle for the host vehicle, and a speed of the host vehicle.

In other features, the brake torque bias control method further includes: during a brake torque bias control mode, biasing brake torque to a selected side of the host vehicle based on actuation of one or more of the paddle shifters; and during a gear shifting control mode, changing gears of a transmission of the host vehicle based on actuation of one or more of the paddle shifters. The devices include the paddle shifters. The paddle shifters are configured to adjust biasing of the first amount of brake torque, biasing of the second amount of brake torque, and shift the gears of the transmission of the host vehicle. A total amount of braking force is applied on the first side of the host vehicle and the second side of the host vehicle is based on position of a brake pedal. The devices include at least one of a human machine interface and at least one switch, which are configured to receive an input to transition between the brake torque bias control mode and the gear shifting control mode.

In other features, the devices include at least one of a human machine interface and at least one switch, which is configured to adjust the first amount of brake torque and the second amount of brake torque.

In other features, the brake torque bias control method further includes: obtaining one or more target parameters including at least one of a target corner speed, a target understeer coefficient, a target oversteer coefficient, and a target lap time; and determining, based on the one or more target parameters, the first amount of brake torque and the second amount of brake torque.

In other features, the brake torque bias control method further includes determining the first amount of brake torque and the second amount of brake torque based on status parameters. The status parameters include a yaw angle of the host vehicle, a yaw rate of the host vehicle, an understeer value of the host vehicle, and a speed of the host vehicle. The method further includes: based on changes in the status parameters due to application of the first amount of brake torque and the second amount of brake torque, evaluating whether a vehicle response is converging towards satisfying the one or more target parameters; based on evaluation of the vehicle response, executing a machine learning algorithm to adjust weighting of the status parameters; and based on the adjusted weighting, applying an updated first amount of brake torque on the first side of the host vehicle and an updated second amount of brake torque on the second side of the host vehicle.

In other features, the brake torque bias control method further includes, while operating in a manual brake torque bias mode, verifying a response of the host vehicle to the first amount of brake torque and the second amount of brake torque applied, and disabling operating in the manual brake torque bias mode in response to an actual amount of brake torque bias being out of a predetermined range from a target brake torque bias.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
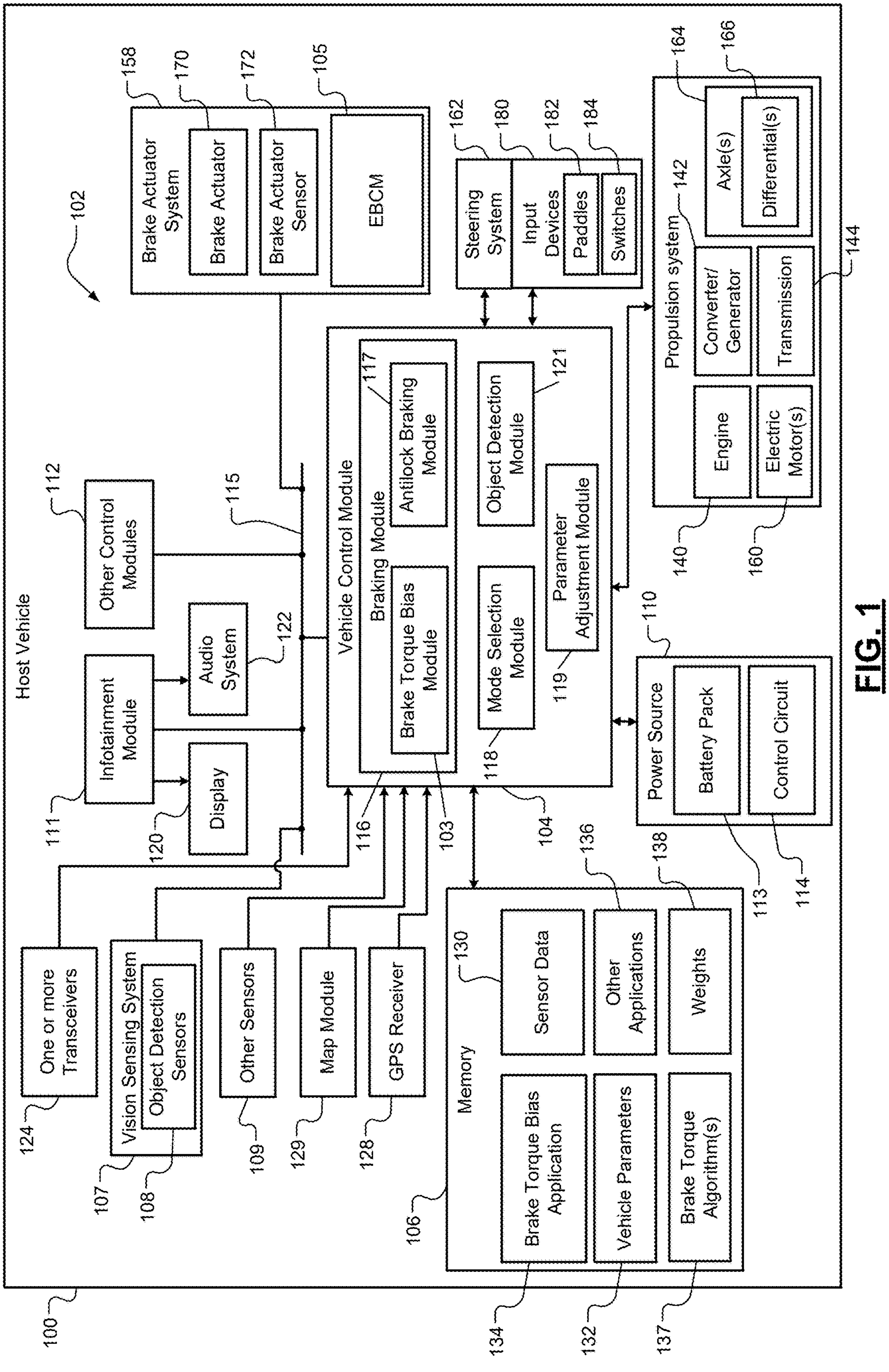
FIG. 1 is a functional block diagram of an example host vehicle including a brake control system including a brake torque bias module in accordance with the present disclosure.

A traditional hydraulic braking system may include two hydraulic circuits, which are configured to apply brake pressure at corresponding brake calipers. As an example, each hydraulic circuit may be used to apply brake pressure at one front wheel caliper and one rear wheel caliper of a four-wheel vehicle. The brake calipers are hydraulically connected to a brake actuator (e.g., a brake pedal), which when pressed actuates the brake calipers to provide brake torque to decelerate a host vehicle.

A brake-by-wire system can implement electromechanical braking (EMB) and include single corner actuators (SCAs). An EMB caliper can include an electronic controller, an electric motor, and wiring connections rather than a simple mechanical caliper.

The examples set forth herein, are applicable to traditional hydraulic braking systems, brake-by-wire systems, and to other types of braking systems (e.g., electrohydraulic braking systems. The examples include a brake torque bias (BTB) module that is configured to operate in an automatic BTB control mode and a manual BTB control mode. During each of these modes, brake torque biasing is enabled and implemented to bias an amount of brake torque applied to one side of the vehicle more than the other side of the vehicle. For example, more brake torque may be provided to a left side of the vehicle than a right side of the vehicle. During the automatic BTB control mode, the BTB module automatically determines and applies a first amount of brake torque to a left side of a host vehicle and a second amount of brake torque to a right side of the host vehicle. The second amount is different than the first amount. During the automatic BTB control mode, an algorithm is implemented which takes vehicle inputs and optimizes for driver preferences and environmental conditions. During the manual BTB control mode, inputs are received from a driver and, based on the inputs, the BTB module determines and applies a first amount of brake torque to a left side of a host vehicle and a second amount of brake torque to a right side of the host vehicle. The amount of brake torque applied on each side of the hoist vehicle and the amount of brake torque bias (or difference between the amount of brake torque applied to the left side and the amount of brake torque applied to the right side) are selected to satisfy optimization (or target) parameters and to adjust an amount of understeer or oversteer. The stated operating modes provide enhanced vehicle performance and driver engagement in track and offroad scenarios, as well as other driving scenarios such as high or low traction conditions (e.g., hot dry days or raining days).

In an embodiment, an algorithm is implemented that allows for manual control of brake torque biasing via paddles and/or HMI, which may be located on and/or behind a steering wheel. The manual control includes use of paddles and/or HMI for controlling brake torque biasing, where a total amount of brake torque applied is controlled via a brake pedal. The algorithm permits operation in the automatic BTB control mode or the manual BTB control mode. During the automatic BTB control mode, machine learning is implemented to optimize brake biasing based on driving conditions and driver preferences. In an embodiment, an advanced driver assistance system (ADAS) is included and used during brake bias control to account for lane positions of the host vehicle and surrounding and/or nearby vehicles.

FIG. 1 shows a host vehicle 100 including a brake control system 102 including a BTB module 103. Although the BTB module 103 is shown as being implemented at a vehicle control module 104, the BTB module 103 may be implemented at an electronic braking control module (EBCM) 105. The BTB module 103 and/or the EBCM 105 provides brake torque biasing when a brake torque biasing mode is enabled. A brake torque biasing mode may be enabled when a brake actuator is actuated (e.g., a brake pedal is pressed) and/or based on an input via, for example, a HMI. In an embodiment, brake torque biasing is enabled when the brake actuator is actuated and/or pressed and is disabled when the brake actuator is not actuated and/or pressed. The HMI may include a display (e.g., the display 120) and/or one or more other input devices. The BTB module 103 performs electronic brake biasing control including determining and applying amounts of brake torque on left and right sides of the host vehicle 100. This is further described below with respect to FIGS. 2-6.

The BTB module 103 and/or the EBCM 105 may select brake pressure versus brake actuator profiles and/or brake force versus brake actuator profiles to follow during braking events for each brake controller of the brake actuator system 158. This selection may be based on permanent vehicle handling characteristics, dynamic vehicle state (or status) parameters, target parameters, location of active brake controllers/calipers on the vehicle 100, etc. The permanent vehicle handling characteristics may refer to suspension geometry of the vehicle, size of brake calipers and pads, number of pistons per caliper, and/or other parameters that are unchanged during operation. The dynamic vehicle state parameters may include yaw angle and yaw rate of the vehicle 100, speed of the vehicle 100, deceleration rate of the vehicle 100, steering angle of a steering wheel and/or front wheels of the vehicle 100, etc. The locations of the active brake controllers may refer to left-front, right-front, left-rear, and right-rear for the four brake controllers and corresponding brake calipers at respective wheels of the vehicle 100. The stated profiles may be i) selected as baselines and provide pressure and/or force values based on the stated characteristics, parameters, locations, and brake torque requests, and/or ii) altered based on the stated parameters and locations and/or corresponding thresholds. The target (or optimization) parameters may include a target corner speed, a target understeer coefficient, a target lap time, a target destination time, etc.

The vehicle 100 may be a non-autonomous, partially autonomous or fully autonomous vehicle. The vehicle 100 may be non-electric, hybrid or fully electric vehicle. The vehicle 100 may include vehicle control module 104, a memory 106, a vision sensing (or perception) system 107 including object detection sensors 108, and other sensors 109. The vision sensing system 107 and sensors 108, 109 may or may not be used for manual control of system. The vehicle 100 may further include a power source 110, an infotainment module 111 and other control modules 112. The power source 110 includes one or more battery packs (one battery pack 113 is shown) and a control circuit 114. The object detection sensors 108 may include cameras, radar sensors, lidar sensors, etc. The other sensors 109 may include temperature sensors, accelerometers, gyroscope, steering angle sensor, wheel speed sensors, a vehicle velocity sensor, and/or other sensors. The modules 103, 104, 105, 111, 112 may communicate with each other and have access to the memory 106 via one or more buses and/or network interfaces 115. The network interfaces 115 may include a controller area network (CAN) bus, a local interconnect network (LIN) bus, an Ethernet network interface, an auto network communication protocol bus, and/or other network bus.

The vehicle control module 104 controls operation of vehicle systems. The vehicle control module 104 may include a braking module 116 including the BTB module 103 and an antilock braking module 117 (associated with an antilock braking system), a mode selection module 118, a parameter adjustment module 119, an object detection module 121, as well as other modules. The antilock braking module 117 regulates braking in order to reduce speed, decelerate, and/or stop a vehicle while preventing brake calipers from locking up during braking events. The mode selection module 118 and/or the BTB module 103 may select a vehicle operating mode such as one of the automatic BTB control mode and the manual BTB control mode. The parameter adjustment module 119 may be used to adjust, obtain and/or determine parameters of the vehicle 100 based on, for example, signals from the sensors 108, 109 and/or other devices and modules referred to herein.

The vehicle 100 may further include the display 120, an audio system 122, and one or more transceivers 124. The display 120 and/or audio system 122 may be implemented along with the infotainment module 111 as part of an infotainment system. The display 120 and/or audio system 122 may be used to receive inputs for manual brake biasing, to indicate error messages, to indicate brake alert messages to apply brakes due to an approaching and/or nearing objects, etc.

The vehicle 100 may further include a global positioning system (GPS) receiver 128 and a MAP module 129. The GPS receiver 128 may provide vehicle velocity and/or direction (or heading) of the vehicle and/or global clock timing information. The GPS receiver 128 may also provide vehicle location information including lane information. The MAP module 129 provides map information. The map information may include traffic control objects, routes being traveled, and/or routes to be traveled between starting locations (or origins) and destinations. The vision sensing system 107, the GPS receiver 128 and/or the MAP module 129 may be used to determine location of objects and position of the host vehicle 100 relative to the objects. This information may also be used to determine i) heading information of the host vehicle 100 and/or the objects, and ii) a relative speed of the host vehicle 100 relative to the objects.

The memory 106 may store sensor data 130, vehicle parameters 132, a brake torque bias application 134 and other applications 136. The memory 106 may further store one or more brake torque algorithms 137 and weights 138 for status parameters, as further described below. The BTB application 134 may be implemented by the BTB module 103 and/or the EBCM 105. The applications 136 may include applications executed by the modules 104, 111, 112. Although the memory 106 and the vehicle control module 104 are shown as separate devices, the memory 106 and the vehicle control module 104 may be implemented as a single device. The memory 106 may be accessible to the EBCM 105. The EBCM 105 may also include memory storing the BTB application 134 and/or brake information, such as brake pressure or force versus brake actuator distance profiles. The brake pressure or force versus brake actuator distance profiles may be stored in the memory 106. See also FIG. 2.

The vehicle control module 104 may control operation of a propulsion system 139 that includes an engine 140, a converter/generator 142, a transmission 144, and/or electric motors 160, as well as control operation of a brake actuator system 158 and/or a steering system 162 according to parameters set by the modules 103, 104, 105, 111, 112, 116-119, 121. The vehicle control module 104 may set some of the vehicle parameters 132 based on signals received from the sensors 108, 109. The vehicle control module 104 may receive power from the power source 110, which may be provided to the engine 140, the converter/generator 142, the transmission 144, the brake actuator system 158, the electric motors 160 and/or the steering system 162, etc. Some of the vehicle control operations may include enabling fuel and spark of the engine 140, starting and running the electric motors 160, powering any of the systems 102, 158, 162, and/or performing other operations as are further described herein.

The engine 140, the converter/generator 142, the transmission 144, the brake actuator system 158, the electric motors 160 and/or the steering system 162 may include actuators controlled by the vehicle control module 104 to, for example, adjust fuel, spark, air flow, steering wheel angle, throttle position, pedal position, etc. This control may be based on the outputs of the sensors 108, 109, the GPS receiver 128, the MAP module 129 and the above-stated data and information stored in the memory 106. The vehicle control module 104 may determine various parameters including a vehicle speed, an engine speed, an engine torque, yaw angle, yaw rate, a gear state, an accelerometer position, a brake pedal position, an amount of regenerative (charge) power, understeer coefficient and/or value, oversteer coefficient and/or value, and/or other information. These parameters may be stored in the memory 106. The propulsion system 139 may also include one or more axles 164 including one or more differentials 166 of one or more axles 164 of the vehicle 100. Brake torque may be transferred via the axles 164 and the differentials 166.

As an example, the brake actuator system 158 may be implemented as a brake-by-wire system, such as an electromechanical braking system or an electrohydraulic braking system. In an embodiment, the brake actuator system 158 may include the EBCM 105, a brake actuator 170 and a brake actuator sensor 172. The brake actuator 170 may include a traditional style brake pedal and/or other brake actuator, such as a handheld brake actuator. The brake actuator sensor 172 detects position of the brake actuator 170, which is used to determine displacement of the brake actuator 170. The EBCM 105 may include a motor (or pump) and an electronic control module for controlling operation of the motor. The motor may adjust brake pressure. The brake pressure may refer to pressure of a hydraulic fluid used to actuate brake pads. In an electromechanical configuration, the motor is not included.

Input devices 180 may be included and used for manual brake torque biasing and manual transmission gear shifting. The input devices 180 may include paddles 182, input switches 184, and/or other input devices. The switches 184 may be located on the steering wheel, on a dashboard, on a center stack (or column), on an armrest, and/or elsewhere in the vehicle 100. The switches 184 may refer to buttons, tabs, toggle devices, etc. At least some of the input devices 180 may be incorporated in the HMI. When the brake actuator 170 is actuated, the brake torque biasing mode may be enabled, such as the automatic BTB control mode or the manual BTB control mode. In the manual BTB control mode, a driver is permitted to adjust torque biasing via the input devices 180. When the brake actuator 170 is not actuated, the gear shifting mode may be enabled, which allows gear shifting. A driver may switch gears via the input devices 180.

In an embodiment, two paddles are included and the vehicle control module 104 transitions between a gear shifting mode and a brake torque biasing mode. When the brake actuator 170 is actuated, the manual BTB control mode is enabled, which allows a driver to adjust torque biasing via the input devices 180. When the brake actuator 170 is not actuated, the gear shifting mode is enabled, which allows a driver to switch gears via the input devices 180. In another embodiment, four paddles are included, two dedicated for gear shifting and another two dedicated for brake torque biasing. In another embodiment, brake torque biasing is enabled when two conditions are met. The first condition refers to when the driver has enabled brake torque biasing via an input (e.g., a display button, a switch, etc.) of the HMI. The second condition refers to when the driver has actuated the brake actuator 170.

In an embodiment and during the manual BTB mode, the driver is able to adjust brake torque biasing by adjusting an amount of pressure applied on the paddles 182 and/or by adjusting how far the paddles 182 are pushed or pulled. This provides for a variable amount of brake torque applied on each side of the host vehicle 100. As an example, a left paddle may be pushed harder and/or farther than a right paddle, which provides more brake torque on a left side of the host vehicle 100 than a right side of the host vehicle 100. The harder and/or further a paddle is pushed the more brake torque applied to the corresponding side of the host vehicle 100. The paddles 182 and/or other input devices may thus be referred to as analog input devices.

In an embodiment, two paddles are provided and shared for brake torque biasing and gear shifting. The paddles are quickly taped by the driver to shift gears and are held in a depressed or pulled state by the driver when being used for brake torque biasing. Brake torque biasing may be provided when one or more paddles are pressed or pulled.

When the vehicle control module 104 or the driver wants to turn in more, more brake torque is biased on the side of the vehicle corresponding to the direction of the turn. When the vehicle control module 104 or the driver wants to turn out more, more brake torque is biased on the side of the vehicle opposite the direction of the turn.

Figure 2:
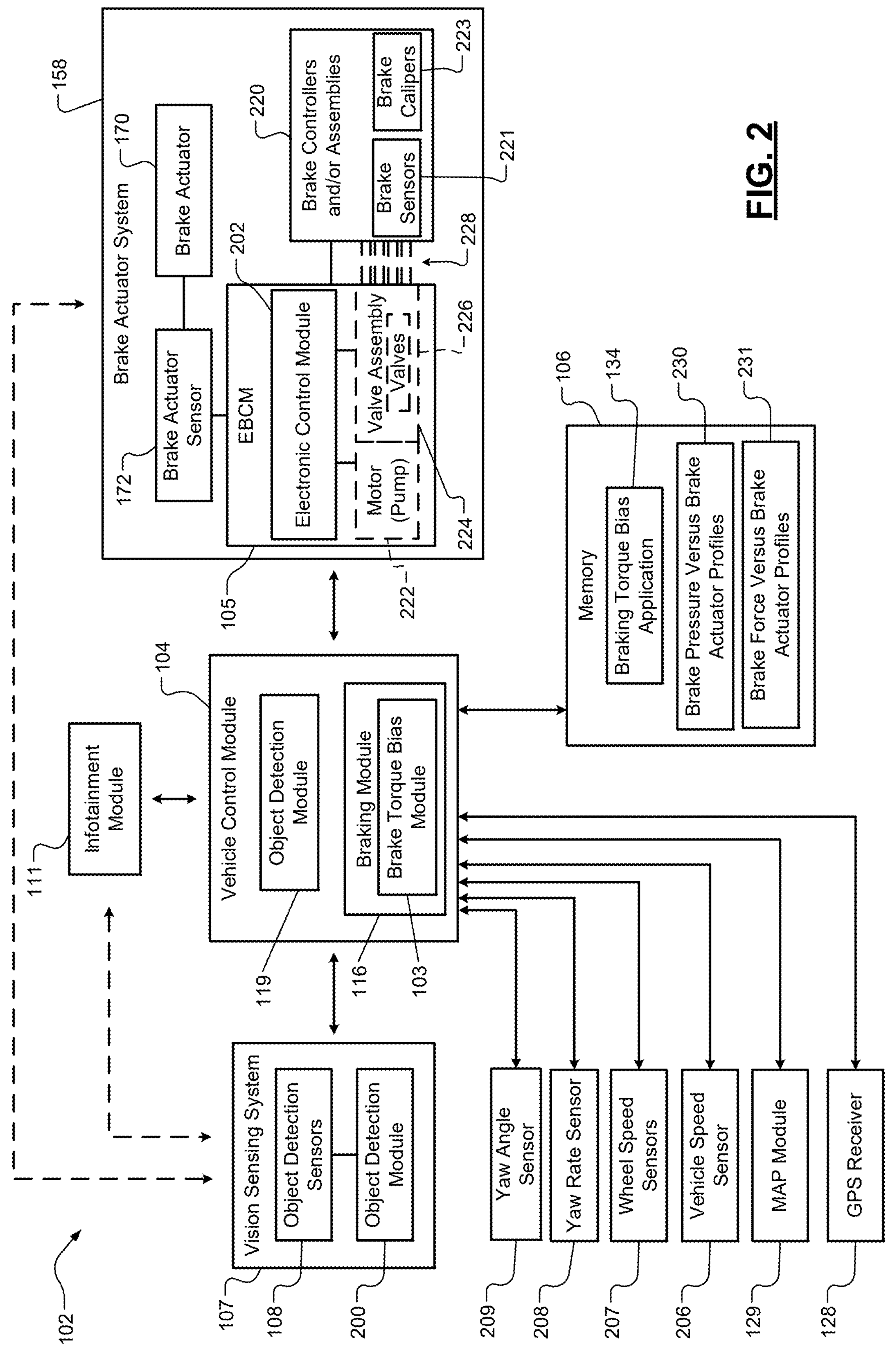
FIG. 2 is a function block diagram of an example of the brake control system of FIG. 1 including the brake torque bias module and an electronic braking control module (EBCM) in accordance with the present disclosure.

FIG. 2 shows the brake control system of FIG. 1 including the BTB module 103 and an electronic braking control module (EBCM), which includes an electronic control module 202. The brake control system 102 further includes the vehicle control module 104, the memory 106, the vision sensing system 107, the infotainment module 111, and the brake actuator system 158. The vision sensing system 107 may include the object detection sensor 108 and an object detection module 200. The object detection module 200 may be implemented at the vehicle control module 104. If implemented at the vision sensing system 107, the object detection module 200 may communicate with the infotainment module 111 and/or, for example, an electronic control module 202 of the EBCM 105. The object detection module 200 may operate similarly as the object detection module 121.

The object detection module 200 may detect objects, determine locations of the objects relative to the host vehicle, and determine headings and speeds of the objects and/or the host vehicle. The speed of the host vehicle may be determined via a vehicle speed sensor 206. The locations, headings and/or speeds of the host vehicle and the objects may be determined via the GPS receiver 128 and the MAP module 129. The object detection module 200 and/or the braking module 116 may determine whether braking is warranted based on the location, heading and speed information. If yes, brakes may be applied and/or an alert message may be sent to the infotainment module 111 to indicate to the driver to apply the brakes. The alert message may be sent from any of the modules 104, 116, 200, 202 to the infotainment module 111.

The vehicle control module 104 may also obtain vehicle speed and wheel speed information from a vehicle speed sensor 206 and wheel speed sensors 207. The vehicle control module 104 may further determine the yaw angle and yaw rate of the vehicle 100 based on an output from a yaw rate sensor 208 (e.g., an accelerometer).

The braking module 116 of the vehicle control module 104 may i) select a brake pressure or force versus brake actuator distance profile (hereinafter referred to as the "selected profile") and send the selected profile to the electronic control module 202 along with a current detected brake actuator displacement value, and/or ii) signal the electronic control module 202 a current detected brake actuator displacement value and object related information. The current detected brake actuator displacement value indicates a current position of the brake actuator 170. The electronic control module 202 may adjust brake pressure or force based on the selected profile and the current detected brake actuator displacement value. The brake pressure and force are directly related. In another embodiment, the electronic control module 202 selects the profile, based on information provided to the electronic control module 202, such as locations, headings, speeds, and/or accelerations/decelerations of the host vehicle and a detected object of concern.

The BTB module 103 and the electronic control module 202 may perform operations as further described below with respect to FIGS. 3-6 to provide brake torque biasing of the vehicle.

The brake actuator system 158, as stated above, may be implemented as a brake-by-wire system, such as an electromechanical braking system or an electrohydraulic braking system The brake actuator system 158 may include the EBCM 105, the brake actuator 170, the brake actuator sensor 172, and brake controllers and/or assemblies 220. The brake actuator system 158 is provided as an example and may be configured differently than shown in FIG. 2. As an example, the brake controllers and/or assemblies 220 may each be referred to as a brake circuit and include a EMB caliper including an electronic controller, an electric motor (or pump), and wiring connections (electromechanical braking system configuration). One or more EBCMs may be included. As an example, an EBCM may be included for the front wheels of the vehicle 100 and another EBCM may be included for the rear wheels of the vehicle.

The EBCM 105 may include the electronic control module 202 and a motor (or pump) 222. The motor 222 may be included for an electrohydraulic braking system configuration. A valve assembly 224 may be included as part of the EBCM 105, as shown or may be separate from the EBCM 105. The valve assembly 224 include valves 226 that may be connected to the motor 222 and control fluid connection between the motor 222 and the brake controllers and/or assemblies 220. Fluid lines 228 may be connected between the valve assembly 224 and the brake controllers and/or assemblies 220. When implemented as an electromechanical braking system, the motor 222, the valve assembly 224 and the fluid lines 228 are not included.

The electronic control module (ECM) 202 and/or BTB module 103 controls the motor 222 and the states of the valves 226 to adjust brake pressure. This may be based on a selected one of the brake pressure versus brake actuator distance profiles 230 stored in the memory 106 and/or pressures indicated by the BTB module 103. This may additionally or alternatively be based on a selected one of brake force versus brake actuator distance profiles 231 stored in the memory 106 and/or forces indicated by the BTB module 103. One of the brake pressure or force versus brake actuator distance profiles 230, 231 may be selected by, for example, the BTB module 103 and/or the electronic control module 202. The stated control may also be based on permanent vehicle handling characteristics and dynamic vehicle state parameters such as yaw angle, yaw rate, vehicle speed, steering angle, and/or other dynamic vehicle state parameters as further described below. The permanent vehicle handling characteristics and the dynamic vehicle state parameters may be stored in the memory 106.

The brake actuator system 158 and/or the brake controllers and/or assemblies 220 may include brake sensors 221 and brake calipers 223. The brake sensors 221 may include pressure sensors, position sensors, temperature sensors, fluid detection sensors, etc. for detecting states of brake circuits, where each brake circuit includes one of the brake controllers and/or assemblies. The states of the brake circuits may include pressures, temperatures and/or presence of hydraulic fluid in each of the brake circuits. Each of the brake circuits includes a respect brake caliper. The sensors are monitored to detect when a failure exists in one or more of the brake circuits. A failure may exist, for example, when a brake actuator motor is ceased, has a short circuit, and/or other issue. A failure may exist when the ECM 202 is not communicating with the vehicle control module 104. This may be detected by the ECM 202 and/or the vehicle control module 104. The vehicle control module 104 may perform brake system diagnostic operations to detect a failure associated with the brake actuator system 158. These parameters are additional examples of the dynamic vehicle state parameters.

Figure 3:
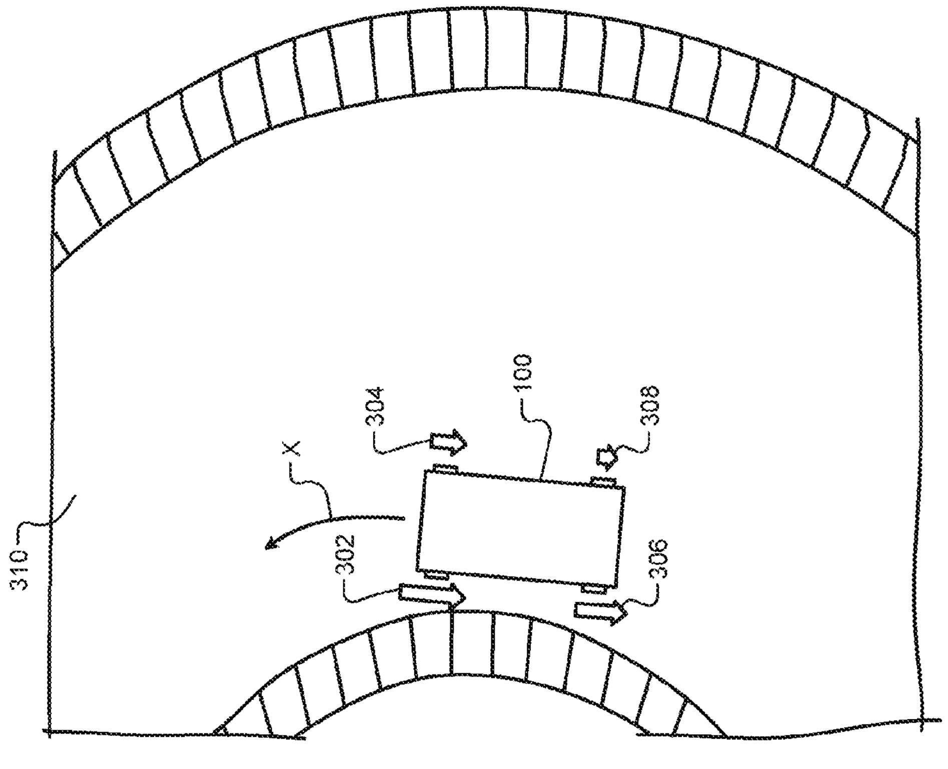
FIG. 3 is a top view of a vehicle providing brake torque bias towards a left side of the vehicle in accordance with an example embodiment of the present disclosure.

FIG. 3 shows a vehicle 300 providing brake torque bias towards a left side of the vehicle 300 when traveling around a corner of a track. Four arrows 302, 304, 306, 308 are shown, representing amounts of brake torque applied to respective calipers of the vehicle 300. The larger the arrow the more brake torque bias applied to the corresponding brake caliper. Although the vehicle 300 is shown moving along a track 310 having a curvature to the left and applying more brake torque to a left side of the vehicle 300 than a right side of the vehicle 300, more brake torque may be applied to the right side than the left side when cornering to the left.

Figure 4:
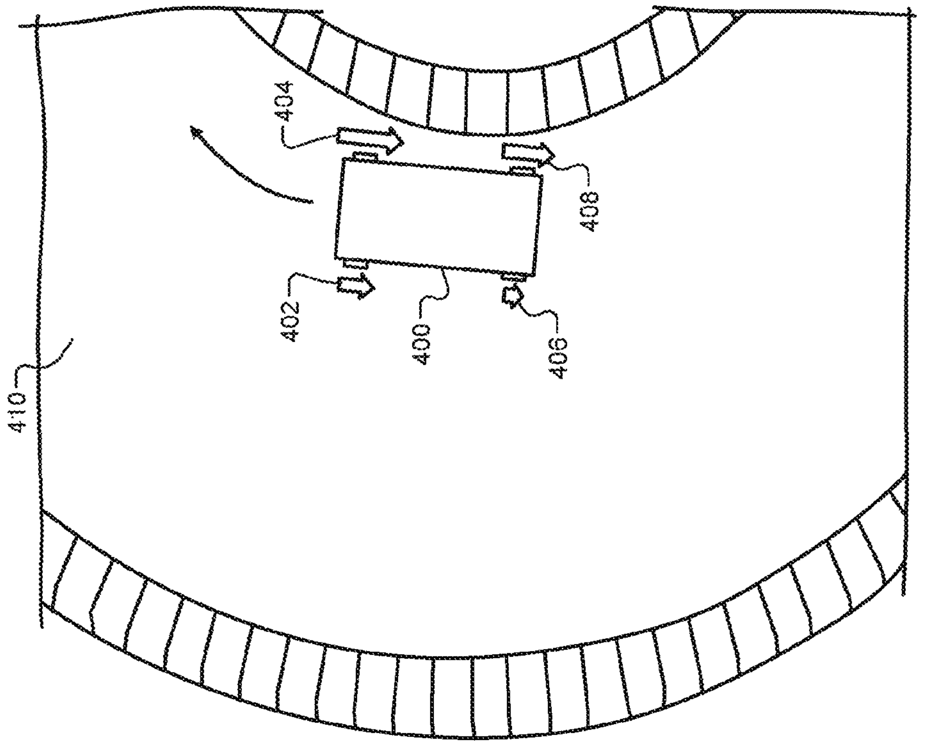
FIG. 4 is a top view of a vehicle providing brake torque bias towards a right side of the vehicle in accordance with an example embodiment of the present disclosure.

FIG. 4 shows a vehicle 400 providing brake torque bias towards a right side of the vehicle 400 when traveling around a corner of a track. Four arrows 402, 404, 406, 408 are shown, representing amounts of brake torque applied to respective calipers of the vehicle 400. The larger the arrow the more brake torque bias applied to the corresponding brake caliper. Although the vehicle 400 is shown moving along a track 410 having a curvature to the right and applying more brake torque to a right side of the vehicle 400 than a left side of the vehicle 400, more brake torque may be applied to the left side than the right side when cornering to the right.

Figure 5:
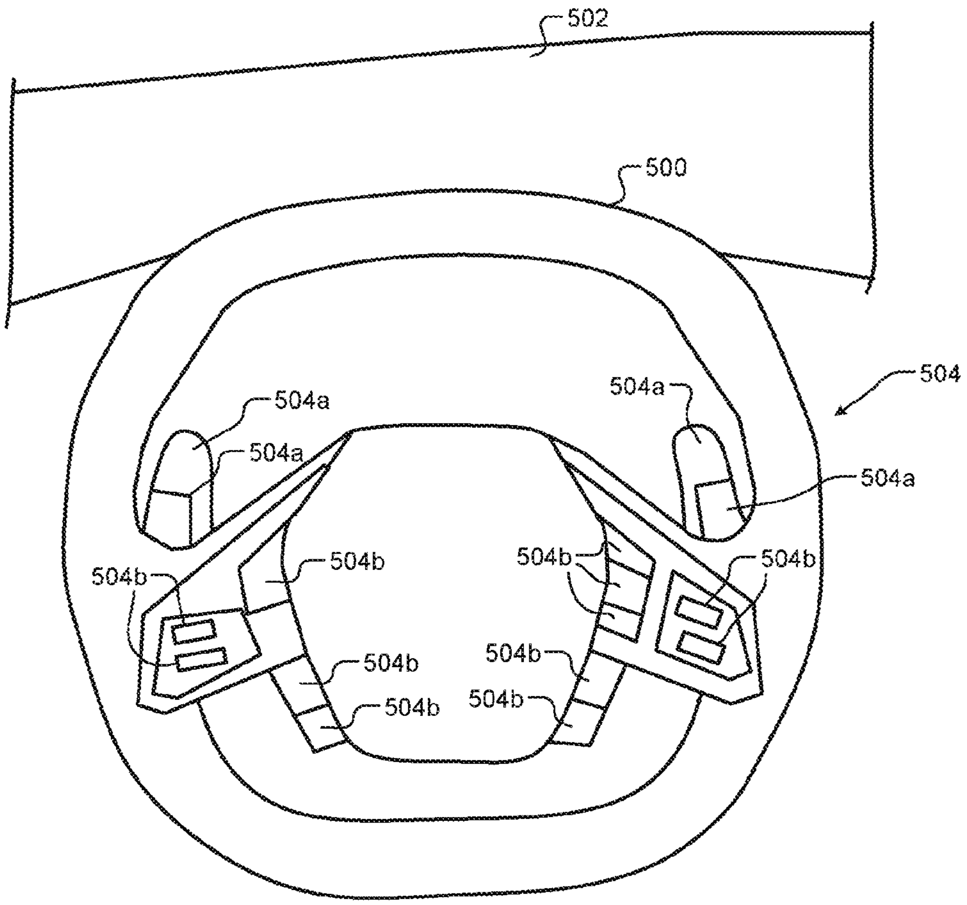
FIG. 5 is a front view of an example steering wheel and human machine interface (HMI) with input devices for operation in a brake torque bias mode in accordance with the present disclosure.

FIG. 5 shows a steering wheel 500 and HMI 502 with input devices 504 for operation in a brake torque bias mode. The input devices 504 include paddle shifters (or paddles) 504*a* and other input devices 504*b*. The other input devices 504*b* may include switches, which may be in various forms, such as pushbutton switches, dial switches, tabs, etc. The input devices 504 are examples of the input devices 180 of FIG. 1.

Figure 6:
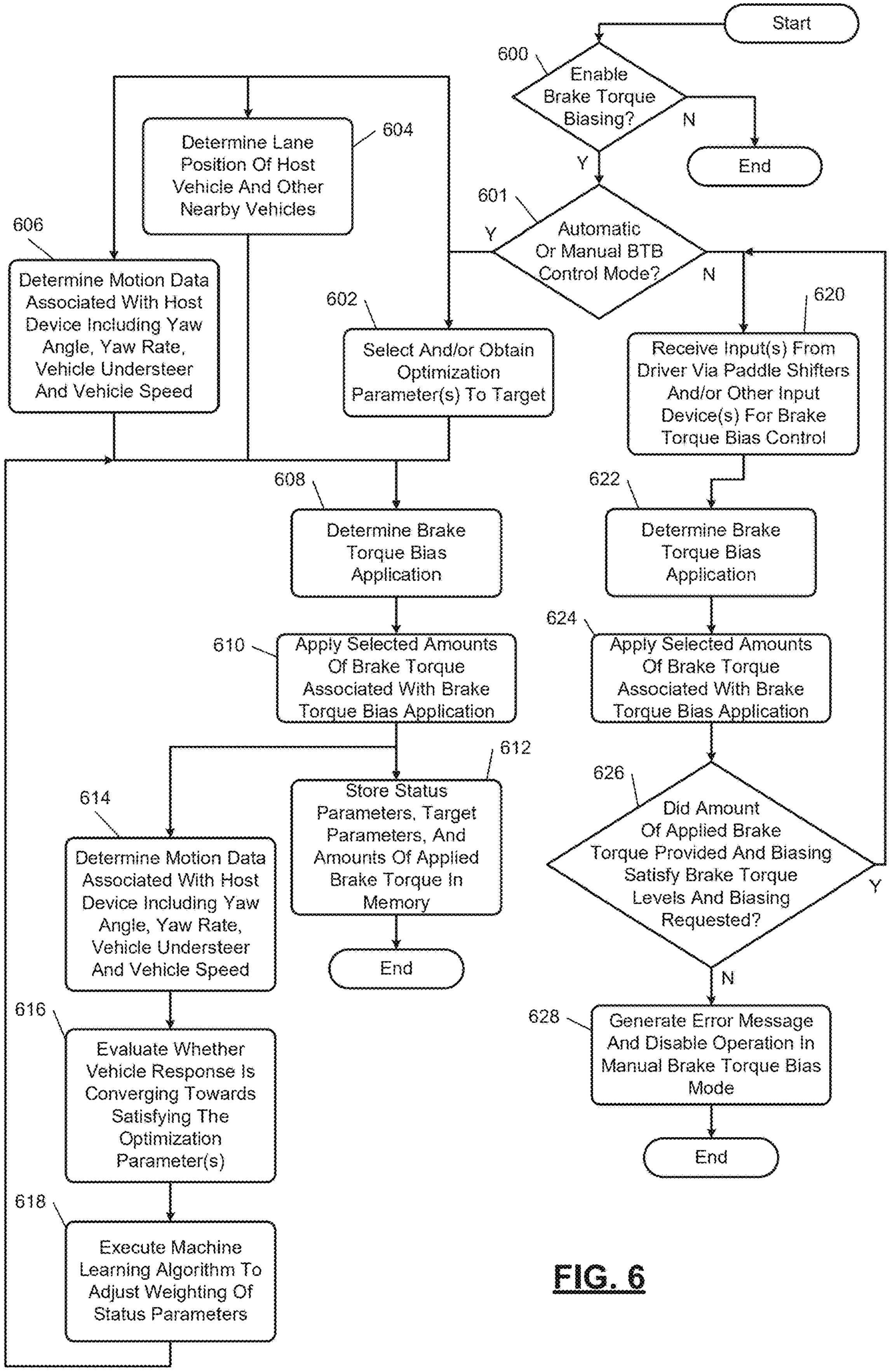
FIG. 6 illustrates a brake torque bias method in accordance with the present disclosure.

FIG. 6 shows a brake torque bias method. The following operations may be iteratively performed. The following operations may be performed by the BTB module 103 of FIGS. 1-2.

At 600, the BTB module 103 determines whether to enable a brake torque biasing. This may be done based on an HMI input and/or whether a brake actuator is actuated as described above. If yes, operation 601 may be performed, otherwise the method may end.

At 601, the BTB module 103 determines whether to operate in the automatic BTB control mode or the manual BTB control mode. If the automatic BTB control mode is enabled, operations 602 is performed, otherwise operation 620 is performed. The manual BTB control mode may be enabled via an HMI input. For example, when an HMI input is set HIGH, the manual BTB control mode is enabled, otherwise the automatic BTB control mode is enabled. In an embodiment, the BTB module 103 may default to one of the automatic and manual BTB control modes when an HMI input is set LOW and may enable the other one of the BTB control modes when the HMI input is set HIGH.

At 602, the BTB module 103 may select and/or obtain optimization parameters to target. As an example, the driver may set optimization parameters via the HMI, which may then be targeted by the BTB module 103. For example, the driver may indicate a preference to maximize cornering speed, a preference to target an understeer coefficient, a preference to target an oversteer coefficient, a preference to minimize lap time, etc. In an embodiment, the BTB module 103 selects the optimization parameters based on driver stored preferences, host vehicle history for selection of these parameters, etc.

At 604, the BTB module 103 determines lane positions of the host vehicle and other nearby vehicles including which lanes the vehicles are in and where in the lanes the vehicles are located.

At 606, the BTB module 103 determines motion data associated with the host device including a yaw angle, a yaw rate, an understeer level, a vehicle speed, and/or other status parameter of the host vehicle. These parameters may be received and/or determined based on outputs of sensors referred to herein.

At 608, the BTB module 103 determines a brake torque bias application including an amount of brake torque to be applied to a left side of the host vehicle and an amount of brake torque to be applied to a right side of the host vehicle. The amount of brake torque applied to the left side is different than amount of brake torque applied to the right side. This is determined based on the optimization (or target) parameters, the lane positions, and the motion data (or status parameters). A weighting is applied to the status parameters when determining the amounts of brake torque applied to each side of the host vehicle. For example, the status parameters may be multiplied by respective weights and the amounts of applied brake torque are determined based on the resultant products of the weights and status parameters.

At 610, the BTB module 103 applies the selected amounts of torque associated with the torque bias application to the brake calipers of the host vehicle.

At 612, the BTB module 103 the status parameters, the target parameters, and the amounts of brake torque applied in the memory 106 of FIG. 1. The stated information is stored and may be used during operation 618 to determine the weighting and/or for other purposes.

At 614, the BTB module 103 may determine motion data associated with the host device including yaw angle, yaw rate, vehicle understeer, and vehicle speed. This may be performed to obtain an update of the status parameters.

At 616, the BTB module 103 evaluates whether the vehicle response, as a result of the performed brake torque biasing including the applying of the amounts of brake torque to the left and right sides of the vehicle, converges the vehicle towards satisfying the optimization parameters. The BTB module 103 may determine, for example, whether the host vehicle is experiencing a faster lap time, is more responsive, is more stable, is receiving positive feedback from the driver, etc.

At 618, the BTB module 103 executes a machine learning algorithm to adjust weighting of status parameters. The machine learning algorithm may be implemented by one or more neural networks of the BTB module 103. The weights may be adjusted based on the results of the evaluation performed at 616. This weighting is used during operation 608 to determine the brake torque bias application including the amounts of brake torque applied on each side of the host vehicle. As an example, if the host vehicle is converging towards satisfying the optimization parameters, then the weighting may be maintained at the same current values, or the weights may be increased or decreased at a same rate as previously changed. If the host vehicle is not converging towards satisfying the optimization parameters, then the weighting may be changed and/or the weights may be increased or decreased at different rates than previously changed.

At 620, the BTB module 103 receives one or more inputs from driver via paddle shifters and/or one or more other input devices for brake torque bias control. As an example, the inputs may be analog inputs and be provided as a percentage between 0-100%. 0% referring to when no input is received and 100% referring to when an input device is fully actuated (e.g., fully pushed or pulled).

At 622, the BTB module 103 determines a brake torque bias application. The BTB module 103 determines amounts of brake torque to apply to left and right sides of the host vehicle based on the inputs received at 620.

At 624, the BTB module 103 applies the selected amounts of brake torque associated with the brake torque bias application.

At 626, the BTB module 103 determines whether the actual amount of brake torque provided on each side of the host vehicle and the amount of brake torque biasing satisfied the amounts of brake torque and biasing requested at 620. This is a verification of delivered brake torque. The amount of actual brake torque on each side of the vehicle and corresponding brake torque biasing may be detected and/or estimated and compared to the requested amounts. The actual amounts may be determined based on, for example, outputs from the brake sensors 221 of FIG. 2.

If the actual amounts of brake torque and biasing are not within a predetermined range (e.g., +5%) of the requested amounts, then the BTB module 103 may generate an error message at 628 and brake torque biasing may be disabled. In which case the method ends. This may occur, for example, when driver is requesting more brake torque and/or more brake torque biasing than is able to be provided. As an example, if the driver is requesting brake torque biasing and the system is providing a maximum amount of deceleration, then the brake torque biasing is not provided as this would reduce the amount of overall braking force being provided. If the actual amounts of brake torque and biasing are within the predetermined range, then operation 620 may be performed and an acknowledgement message may be generated indicated that the requested amounts of brake torque were provided. Changes to the weights may also be based on host vehicle location, driving conditions and application, driver behavior, driver preferences (e.g., more or less understeer, maximize speed through corners, etc.) and/or other parameters. The messages may be stored, accessed, and/or displayed, for example, on the HMI. In an embodiment, the amount of brake torque being applied, the amount of brake torque biasing, and/or the side of the vehicle being biased may be indicated and/or displayed via the HMI.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples improve vehicle performance and allow for increased driver engagement in a manual driving mode. The examples allow brake torque biasing to be tailored to specific driver preferences such as optimizing for corner speed or targeting for more vehicle responsiveness and/or more vehicle stability.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curi, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A brake torque bias control system for a host vehicle, the brake torque bias control system comprising:

a plurality of devices configured to generate a plurality of signals, wherein the plurality of devices comprise a plurality of paddle shifters; and a control module configured, based on the plurality of signals, to bias a first amount of brake torque applied to a first side of the host vehicle to be greater than a second amount of brake torque applied to a second side of the host vehicle, wherein the control module is configured to adjust an amount of brake torque biasing on a left side or a right side of the host vehicle based on inputs from the plurality of paddle shifters.

2. The brake torque bias control system of claim 1, wherein the plurality of devices are sensors configured to detect parameters of at least one of the host vehicle and another vehicle.

3. The brake torque bias control system of claim 2, wherein the parameters include a lane position of the host vehicle and a lane position of the another vehicle.

4. The brake torque bias control system of claim 2, wherein the parameters comprise at least one of yaw angle of the host vehicle, a yaw rate of the host vehicle, an understeer angle for the host vehicle, and a speed of the host vehicle.

5. The brake torque bias control system of claim 1, wherein the plurality of paddle shifters are configured to adjust the first amount of brake torque, the second amount of brake torque, and shift gears of a transmission of the host vehicle.

6. The brake torque bias control system of claim 5, wherein:

the plurality of devices include at least one of a human machine interface and at least one switch, which are configured to receive an input to transition between a brake torque bias control mode and a gear shifting control mode;

during the brake torque bias control mode, the control module is configured to bias brake torque to a selected side of the host vehicle based on actuation of one or more of the plurality of devices; and during the gear shifting control mode, the control module is configured to change the gears of the transmission of the host vehicle based on actuation of one or more of the plurality of devices.

7. The brake torque bias control system of claim 1, wherein the plurality of devices include at least one of a human machine interface and at least one switch, which is configured to adjust the first amount of brake torque and the second amount of brake torque.

8. The brake torque bias control system of claim 1, wherein the control module is configured to:

obtain one or more target parameters including at least one of a target corner speed, a target understeer coefficient, a target oversteer coefficient, and a target lap time; and determine, based on the one or more target parameters, the first amount of brake torque and the second amount of brake torque.

9. The brake torque bias control system of claim 8, wherein:

the control module is configured to determine the first amount of brake torque and the second amount of brake torque based on a plurality of status parameters; and the plurality of status parameters comprise a yaw angle of the host vehicle, a yaw rate of the host vehicle, an understeer value of the host vehicle, and a speed of the host vehicle.

10. The brake torque bias control system of claim 9, wherein the control module is configured, based on changes in the plurality of status parameters due to application of the first amount of brake torque and the second amount of brake torque, to evaluate whether a vehicle response is converging towards satisfying the one or more target parameters.

11. The brake torque bias control system of claim 10, wherein the control module is configured, based on evaluation of the vehicle response, to execute a machine learning algorithm to adjust weighting of the plurality of status parameters, and based on the adjusted weighting, to apply an updated first amount of brake torque on the first side of the host vehicle and an updated second amount of brake torque on the second side of the host vehicle.

12. The brake torque bias control system of claim 1, wherein the control module is configured, while operating in a manual brake torque bias mode, to verify a response of the host vehicle to the first amount of brake torque and the second amount of brake torque applied, and to disable operating in the manual brake torque bias mode in response to an actual amount of brake torque bias being out of a predetermined range from a target brake torque bias.

13. A brake torque bias control method comprising:

generating a plurality of signals via a plurality of devices of a host vehicle;

based on the plurality of signals, biasing a first amount of brake torque applied to a first side of the host vehicle to be greater than a second amount of brake torque applied to a second side of the host vehicle;

obtaining one or more target parameters and a plurality of status parameters;

determining, based on the one or more target parameters and the plurality of status parameters, the first amount of brake torque and the second amount of brake torque;

evaluate whether a vehicle response is converging towards satisfying the one or more target parameters;

based on evaluation of the vehicle response, executing a machine learning algorithm to adjust weighting of the plurality of status parameters; and based on the adjusted weighting, applying an updated first amount of brake torque on the first side of the host vehicle and an updated second amount of brake torque on the second side of the host vehicle.

14. The brake torque bias control method of claim 13, wherein:

the plurality of devices are sensors configured to detect parameters of at least one of the host vehicle and another vehicle;

the parameters include a lane position of the host vehicle and a lane position of the another vehicle; and the parameters comprise at least one of yaw angle of the host vehicle, a yaw rate of the host vehicle, an understeer angle for the host vehicle, and a speed of the host vehicle.

15. The brake torque bias control method of claim 13, further comprising:

during a brake torque bias control mode, biasing brake torque to a selected side of the host vehicle based on actuation of one or more of a plurality of paddle shifters; and during a gear shifting control mode, changing gears of a transmission of the host vehicle based on actuation of one or more of the plurality of paddle shifters, wherein the plurality of devices comprise the plurality of paddle shifters, the plurality of paddle shifters are configured to adjust biasing of the first amount of brake torque, biasing of the second amount of brake torque, and shift the gears of the transmission of the host vehicle, a total amount of braking force applied on the first side of the host vehicle and the second side of the host vehicle is based on position of a brake pedal, and the plurality of devices include at least one of a human machine interface and at least one switch, which are configured to receive an input to transition between the brake torque bias control mode and the gear shifting control mode.

16. The brake torque bias control method of claim 13, wherein the plurality of devices include at least one of a human machine interface and at least one switch, which is configured to adjust the first amount of brake torque and the second amount of brake torque.

17. The brake torque bias control method of claim 13, further comprising:

obtaining the one or more target parameters including at least one of a target corner speed, a target understeer coefficient, a target oversteer coefficient, and a target lap time; and determining, based on the one or more target parameters, the first amount of brake torque and the second amount of brake torque.

18. A brake torque bias control method comprising:

generating a plurality of signals via a plurality of devices of a host vehicle;

based on the plurality of signals, biasing a first amount of brake torque applied to a first side of the host vehicle to be greater than a second amount of brake torque applied to a second side of the host vehicle;

determining the first amount of brake torque and the second amount of brake torque based on a plurality of status parameters, wherein the plurality of status parameters comprise a yaw angle of the host vehicle, a yaw rate of the host vehicle, an understeer value of the host vehicle, and a speed of the host vehicle;

based on changes in the plurality of status parameters due to application of the first amount of brake torque and the second amount of brake torque, evaluating whether a vehicle response is converging towards satisfying one or more target parameters;

based on evaluation of the vehicle response, executing a machine learning algorithm to adjust weighting of the plurality of status parameters; and based on the adjusted weighting, applying an updated first amount of brake torque on the first side of the host vehicle and an updated second amount of brake torque on the second side of the host vehicle.

19. The brake torque bias control method of claim 13, further comprising, while operating in a manual brake torque bias mode, verifying a response of the host vehicle to the first amount of brake torque and the second amount of brake torque applied, and disabling operating in the manual brake torque bias mode in response to an actual amount of brake torque bias being out of a predetermined range from a target brake torque bias.

20. The brake torque bias control system of claim 1, wherein the control module is configured to:

transition between operating in a brake torque bias control mode and a gear shifting control mode;

control the brake torque biasing based on the inputs from the plurality of paddle shifters when in the brake torque bias control mode; and control gear shifting based on inputs from the plurality of paddle shifters when in the gear shifting control mode.

* * * * *